(12) United States Patent
Gernhuber et al.

(10) Patent No.: US 7,491,358 B2
(45) Date of Patent: Feb. 17, 2009

(54) METHOD AND DEVICE FOR REGULATING THE TEMPERATURE OF PARISONS

(75) Inventors: Matthias Gernhuber, Hamburg (DE); Dirk Reimer, Hamburg (DE); Klaus Vogel, Barsbuettel (DE)

(73) Assignee: SIG Corpoplast GmbH & Co. KG., Hamburg (DE)

( * ) Notice: Subject to any disclaimer, the term of this patent is extended or adjusted under 35 U.S.C. 154(b) by 909 days.

(21) Appl. No.: 10/476,426

(22) PCT Filed: Mar. 12, 2002

(86) PCT No.: PCT/DE02/00875

§ 371 (c)(1),
(2), (4) Date: Oct. 30, 2003

(87) PCT Pub. No.: WO02/087850

PCT Pub. Date: Nov. 7, 2002

(65) Prior Publication Data

US 2004/0113326 A1    Jun. 17, 2004

(30) Foreign Application Priority Data

Apr. 30, 2003 (DE) .............................. 101 21 160

(51) Int. Cl.
*B29C 49/64* (2006.01)
*B29C 49/78* (2006.01)
*H05B 6/00* (2006.01)

(52) U.S. Cl. ............... 264/454; 264/458; 264/40.1; 264/40.6; 264/535; 425/143; 425/174.4; 425/526; 425/534

(58) Field of Classification Search .............. 264/454, 264/458, 40.1, 40.6, 535; 425/143, 174.4, 425/526, 534

See application file for complete search history.

(56) References Cited

U.S. PATENT DOCUMENTS

| 3,865,912 | A | | 2/1975 | Rosenkranz et al. |
| 4,079,104 | A | | 3/1978 | Dickson et al. |
| 4,147,487 | A | | 4/1979 | Dickson et al. |
| 4,396,816 | A | * | 8/1983 | Krishnakumar et al. ..... 219/770 |
| 4,571,173 | A | | 2/1986 | Chang et al. |
| 4,606,723 | A | | 8/1986 | Pasternicki |

(Continued)

FOREIGN PATENT DOCUMENTS

DE         2352926         4/1975

(Continued)

*Primary Examiner*—Suzanne E. McDowell
(74) *Attorney, Agent, or Firm*—Harness, Dickey & Pierce

(57) ABSTRACT

A method and device serve the tempering preforms of a thermoplastic material. The preforms are modeled subsequent to tempering into a container inside a blow-molding mold by the action of a medium under pressure. During tempering, the preforms are heated by being acted upon by a heat radiation as well as cooled by being blown upon with cooling air, at least in the surface region. For compensation of a change in the surface temperature of the preforms due to operating ambient parameters, a change in the intensity in the subjecting of the preforms to cooling air is conducted. This takes place such that with simultaneous heating and cooling a basically constant surface temperature of the preform is attained. In addition, the intensity of heat radiation can be regulated for adaptation to at least one operating parameter.

24 Claims, 10 Drawing Sheets

U.S. PATENT DOCUMENTS

| | | | |
|---|---|---|---|
| 5,032,700 A * | 7/1991 | Sugiyama et al. | 219/601 |
| 5,322,651 A | 6/1994 | Emmer | |
| 5,869,110 A | 2/1999 | Ogihara | |
| 6,146,134 A | 11/2000 | Kresal et al. | |

FOREIGN PATENT DOCUMENTS

| | | |
|---|---|---|
| DE | 3101282 | 8/1982 |
| DE | 4212248 | 1/1996 |
| DE | 69306152 | 5/1997 |
| DE | 19608570 | 9/1997 |
| DE | 29810567 | 10/1998 |
| DE | 19724621 | 12/1998 |
| DE | 19736462 | 2/1999 |
| DE | 69603044 | 10/1999 |
| DE | 19843053 | 3/2000 |
| EP | 0706874 | 4/1995 |
| JP | 60034827 | 2/1985 |
| JP | 11188785 | 7/1999 |

* cited by examiner

US 7,491,358 B2

METHOD AND DEVICE FOR REGULATING THE TEMPERATURE OF PARISONS

This application is the national phase under 35 U.S.C. § 371 of PCT International Application No. PCT/DE02/00875 which has an International filing date of Mar. 12, 2002, which designated the United States of America and which claims priority on German Patent Application number DE 101 21 160.0 filed Apr. 30, 2001, the entire contents of which are hereby incorporated herein by reference.

FIELD OF THE INVENTION

The invention generally relates to a method for tempering preforms of a thermoplastic material, which are transformed subsequent to tempering inside a blow mold by the action of a medium under pressure in a container in which the preforms are heated by being subjected to heat irradiation as well as cooled by being blown upon cold air at least in the surface region.

The invention moreover generally relates to a device for tempering preforms of a thermoplastic material which is provided with at least one heating element and at least one cooling air blower, and which is arranged in the region of a transport path of the preforms, which connects a preform input with a blowing station.

BACKGROUND OF THE INVENTION

With a container molding by blowing pressure action, the tempered preforms of a thermoplastic material, for example preforms of PET (polyethylene terephthalate), are fed to different processing stations inside a blow-molding machine. Typically such a blow-molding machine has a heating apparatus as well as a blow-molding apparatus in whose region the previously tempered preform is expanded by biaxial orientation toward a container. The expansion takes place with the aid of compressed air, which is introduced in a controlled manner into the preform to be expanded. The process engineering sequence of such an expansion of the preform is explained in German published patent specification DE-OS 43 40 291.

The basic construction of a blow-molding station for container molding is described in German published patent specification DE-OS 42 12 583. Possibilities for tempering the preforms are explained in DE-OS 23 52 926.

The preforms as well as the blow-molded containers can be transported with the aid of various handling devices inside the device for blow molding. The use of transport mandrels upon which the preforms can be placed has proven particularly useful. The preforms can, however, also be handled with other carrying devices. The use of gripping tongs for handling preforms and the use of expanding mandrels, which can be introduced for fastening the preform in an opening region, likewise belong to the available constructions.

The already explained handling of the preforms takes place for one in so-called two step processes in which the preforms are first produced in an injection molding process, subsequently subjected to intermediate storage and only later conditioned with respect to their temperature and blow-molded to a container. Secondly, a use in so-called single step methods occurs in which the preforms are suitably tempered immediately after their injection molding production and sufficient solidification and subsequently blow-molding takes place.

Various embodiments are known with respect to the blow-molding stations used. In the case of blowing stations which are arranged on rotating transport wheels, a book-like ability to fold out of the joists can be encountered. Using joists, which can be slid relative to one another or are guided otherwise, are also possible. In stationary blow-molding stations, which are in particular suited for accommodating several cavities for container molding, typically plates arranged parallel to one another are used as joists.

The implementation of a heating of the preforms in connection with a two stage method as well as the corresponding temperature profiling in conducting the one step method as a rule takes place using infrared radiators. With such infrared radiators, relatively high amounts of energy can be introduced into the preforms in a short time.

Conducting a heating of the preforms with high frequency is likewise already known, as a high degree of efficiency can be attained this heating type. A device for implementing high frequency heating is described, for example, in European published patent specification EP-OS 0 849 067.

A typical problem in using heat radiation, especially when using infrared radiation, resides in that a considerable portion of radiation is already converted beneath the surface of the preforms into heat energy, which is then spread further by heat conduction. Owing to the relatively poor heat conductivity of the plastics used, a heat conduction process of this type requires a period of time which can, with the use of high radiation output, lead to causing excessive heating of the surface region of the preform. For this reason, typically cooling air blowers are used at the same time when the preforms are subjected to radiation heating, which produce a surface cooling of the preforms. The concept of cooling air blower here includes not only a use of ambient air, but if need be other suitable gaseous cooling mediums can also be conducted in the direction of the preform. The use of ambient air as cooling air nonetheless has considerable advantages as to cost.

In accordance with a typical process sequence, the preform is provided with a temperature profile in the direction of its long axis. A temperature profile is likewise generated in the peripheral direction of the preform as well when the containers to be blow-molded have special contours. In addition to this, a temperature profile also arises through the wall of the preform proceeding from the outer surface in the direction of the inner surface which is dependent upon the radiation introduced, the effective amount of cooling air, the flow conditions arising and additionally by diverse ambient parameters.

The great number of influencing factors, which change the temperature profile arising between the outer surface and the inner surfaces of the preform, lead to the fact that not all demands for as consistent a production quality can yet be fulfilled. The particular problem in this connection is that the temperature profiles arising have a considerable influence on the material distribution in the blow-molded container as well as on the orientation conditions inside the material of the blow-molded container.

A further influencing factor resides in that, when using a blow-molding machine in a so-called inline operation with direct coupling with a subsequent filling machine, frequently increases and decreases of the production output of the blow-molding machine are necessary. This leads to further unevenness in the manufactured product due to the thermal time constants arising, for example, in heating the machine as well as the heating components themselves.

SUMMARY OF THE INVENTION

An objective of an embodiment of the present invention may be to improve a method such that an even tempering of a large number of preforms relative to one another is supported.

An objective may be accomplished in accordance with an embodiment of the invention in that, for compensation of a change in the surface temperature of the preforms on the basis of the effective ambient parameters, a change in the intensity of the subjection of the preforms to cooling air is conducted such that with simultaneous heating supply and cooling supply, a basically constant surface temperature of the preforms is obtained.

A further objective of an embodiment of the present invention is to construct a device of the type mentioned at the beginning such that a consistent production quality is supported.

An objective may be accomplished in accordance with an embodiment of the invention wherein the cooling air blower is connected to a control unit, which evaluates a measurement signal of at least one temperature sensor, which records a temperature of the preforms, and wherein the control unit has a characteristic for approximately keeping the surface temperature of the preform constant depending upon a specified target value for the purpose of specifying a target value for a output of the cooling blower.

By regulating the cooling air blower as a function of the detected surface temperature of the preform, it is possible to operate the heat radiator permanently in an optimal frequency range and in this way to obtain an optimum with respect to energy utilization as well as in respect to as rapid and as effective heating of the preforms as possible.

In accordance with a preferred embodiment, conducting a control of the heating element in addition to controlling the cooling air blower is planned. For the heating element, a control range is selected around a radiation optimum such that even when conducting control processes of the heating element operation with almost optimal radiation emission is guaranteed. When regulating both the output or the conveyance temperature of cooling air as well as regulating the heat output, the control process can be implemented according to a common regulation or control concept or according to respectively optimized regulation concepts.

The change of the intensity of heat radiation and the intensity of the action of cooling air upon the preforms independently of each other makes it possible to implement a specified temperature profile between the interior wall of the preform and the outer wall of the preform relatively exactly and reproducibly. In particular, it is possible, through the possible changes for radiation intensity as well as for cooling intensity to compensate for a large number of effective ambient parameters and to configure starting processes of the production machine on the basis of known thermal time constants such that a good and consistent product quality can be attained very rapidly following a machine start up.

In particular it is suggested to define the temperature profile for a nominal operation to be established by controlling the intensity of heat radiation and to compensate for acting ambient parameters through regulation of the cooling air blower. Such a mode of operation has the advantage, especially when infrared radiators are used, of realizing a high infrared percentage in the emitted radiation with as high an operating temperature as possible. With a drop in temperature of the heat radiator, only a small penetration depth of the radiation energy into the material of the preform could be attained by a shift of the spectral band, owing to which a spread of the heat energy into the inner regions of the preform would become more difficult or take longer.

To furnish a quiet regulation behavior, it is suggested to conduct a change of the cooling output when a specifiable deviation of the surface temperature from a target value occurs.

To realize a closed control circuit, in particular measuring the surface temperature of at least some of the preforms that are to be measured is planned.

A temperature measurement can be conducted in that the surface temperature of the preforms is measured using a pyrometer.

An exact adherence to a specified temperature profile through the wall of the preform can be attained in that the inner temperature of at least some of the preforms is measured.

A temperature measurement can also take place in that the inner temperature of at least some of the preforms is measured by a pyrometer.

A simple realization in terms of hardware for measuring the inner temperature can take place in that the pyrometer for conducting the measurement is moved at least in sections into an interior space of the preform.

For effective tempering of a large number of preforms per time unit, transporting the preforms past spatially stationary heating element is proposed.

A generation of motion of simple design of the pyrometer for measuring the internal temperature can take place in that moving a pyrometer into the interior space of a preform and out of it is mechanically derived from the transport motion of the preform.

To guarantee as optimal a use of heating element capacity as possible, it is proposed that an internal temperature of the preforms be controlled through the heating elements and an outer temperature of the preforms be regulated through the blower.

An improved control behavior can be implemented in that a temperature inertia of the material of the preforms is compensated for by a mathematical model of the controlled system implemented into the regulation unit.

To guarantee avoiding longer-lasting control deviations, providing at least one of the regulation units that are used with an integral action component is proposed.

An effective implementation of the heating of the preforms is supported by heating the preforms with infrared radiation.

To support a production of containers with complicated contours, it is proposed that the preforms be provided with a temperature profile in their longitudinal direction.

Likewise it proves advantageous in manufacturing containers with cross sectional shapes that deviate from a circular contour to provide the preforms with a temperature profile in their peripheral direction.

Slight deviations from specified target values can be attained in that a change in cooling output is conducted simultaneously with a change in heat radiation taking the temperature properties of the preforms into consideration before a regulatory deviation occurs.

An effective measure for influencing the cooling output consists in that the cooling output is altered by regulating the rotational speed of the cooling blowers used.

To guarantee a long-lasting operational capacity of the cooling air blower, restricting ventilation output to minimal and maximal values is proposed.

A further improvement of regulatory quality can be attained in that a cascade regulation is implemented.

BRIEF DESCRIPTION OF THE DRAWINGS

The present invention will become more fully understood from the detailed description of preferred embodiments given hereinbelow and the accompanying drawings, which are given by way of illustration only and thus are not limitative of the present invention, and wherein.

DETAILED DESCRIPTION OF THE PREFERRED EMBODIMENTS

Figure 1:
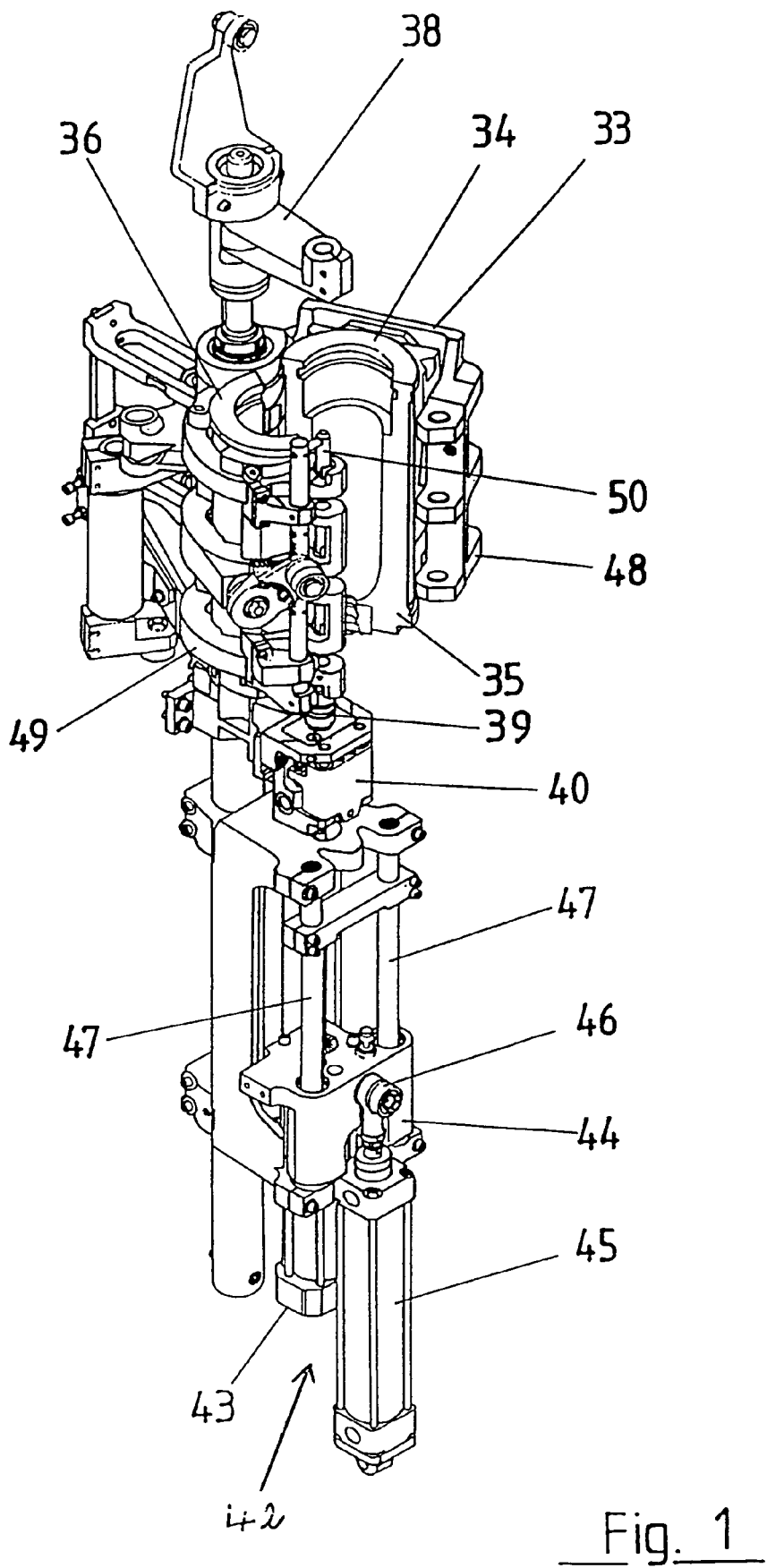
FIG. 1: Illustrates a perspective representation of a blow-molding station for manufacturing containers from preforms.
Figure 2:
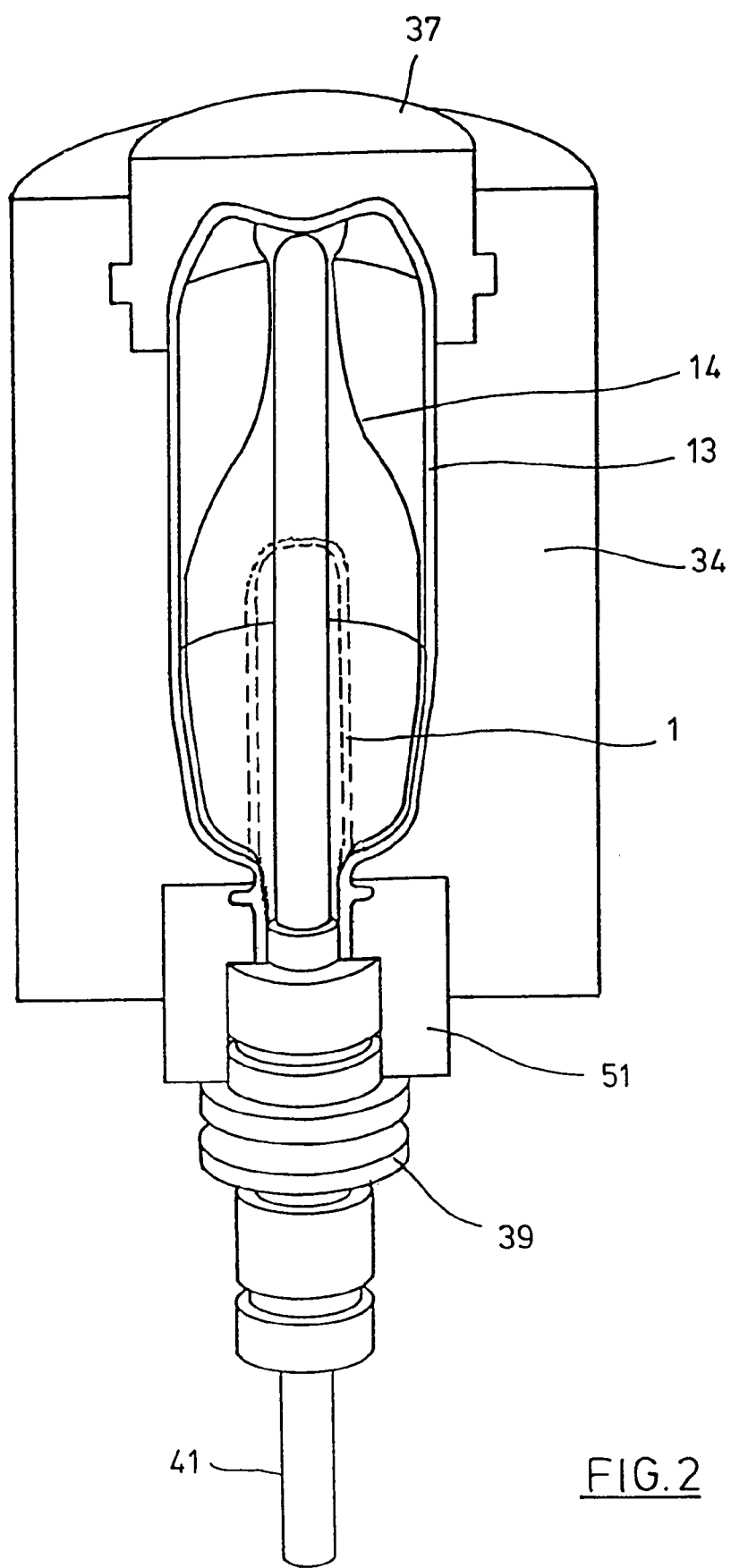
FIG. 2: Illustrates a longitudinal section through a blow-molding mold in which a preform is elongated and expanded.

The principal structure of a device for molding performs (1) into containers (13) is represented in FIG. 1 and in FIG. 2.

The device for molding the container (13) basically consists of a blow-molding station (33) which is provided with a blow-molding mold (34) into which a preform (1) can be inserted. The preform (1) can be an injection molded part of polyethylene terephthalate. To enable inserting the preform (1) into the blow-molding mold (34) and for enabling removing the finished container, the blow-molding mold (34) consists of mold halves (35, 36) and a bottom element (37), which can be positioned by a lifting device (38). The preform (1) can be held in the region of the blow-molding station (33) by a transport mandrel (39), which runs through a large number of processing stations inside the device together with the preform (1). It is also possible, however, to insert the preform directly into the blow-molding mold (34) with tongs, for example, or other handling devices.

To make a compressed air supply possible, a connection piston (40) is arranged beneath the transport mandrel (39) which supplies the preform (1) with compressed air and at the same time undertakes a sealing relative to the transport mandrel (39). It is basically also possible with a modified design to use fixed compressed air supply lines.

An elongation of the preform (1) takes place with the aid of an elongation rod (41), which is positioned by a cylinder (42). Basically it is also conceivable, however, to conduct a mechanical positioning of the elongation rod (41) over curve segments, which is acted upon by pick up roller. The use of curved segments is especially appropriate when a large number of blow-molding stations (33) are arranged on a rotating blowing wheel. A use of cylinders (42) is appropriate if stationary arranged blow-molding stations (33) are provided.

In the embodiment represented in FIG. 1, an elongation system is constructed such that a tandem arrangement of two cylinders (42) is furnished. The elongation rod (41) is moved by a primary cylinder (43) right before beginning the elongation process up to the region of the floor of the preform (1). During the elongation process, the primary cylinder (43) with the elongation rod extended is positioned together with a sliding carriage (44) bearing the primary cylinder (43) by a secondary cylinder (45) or through a curve control unit. It is especially planned to use the secondary cylinder (45) in such a curve-controlled manner that a respective elongation position is specified by a guide roller (46), which slides along a curved track while conducting the elongation process. The guide roller (46) is pressed by the secondary cylinder (45) against the guide track. The sliding carriage (44) slides along two guide elements (47).

After a closing of the mold halves (35, 36) arranged in the region to the supports (48, 49), a latching of the supports (48, 49) relative to one another takes place with the aid of a latching apparatus (50).

To adapt to different molds of the muzzle segment, the use of separate threaded inserts (51) in the region of the blow-molding mold (34) is provided in accordance with FIG. 2.

FIG. 2 also shows the preform (1) drawn in dotted lines and schematically a developing container bubble (14) in addition to the blow-molded container (13).

Figure 3:
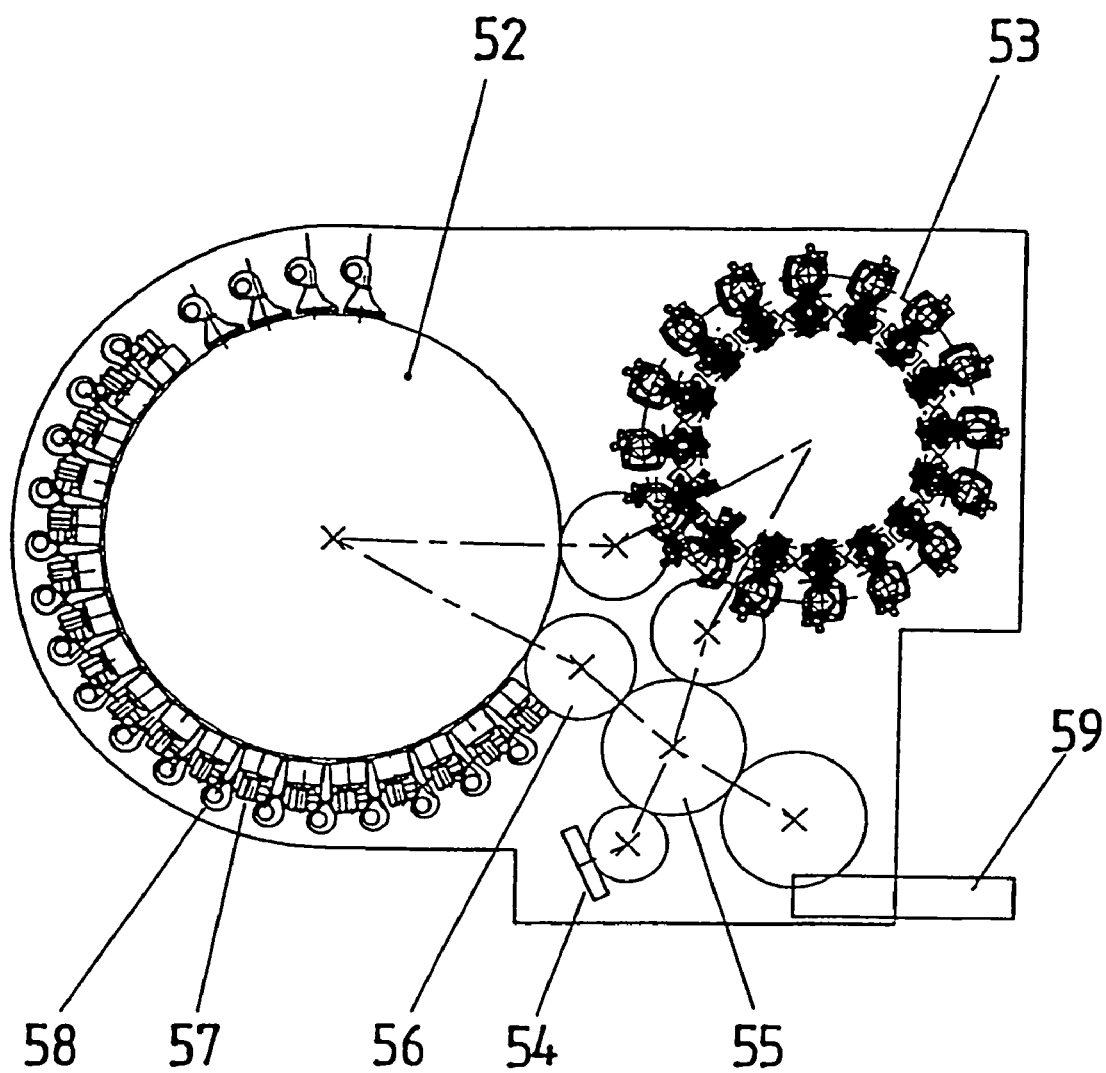
FIG. 3: Illustrates a sketch for illustrating a basic design of a device for blow molding of containers.

FIG. 3 shows the basic design of a blow-molding machine, which is provided with a rotating heating wheel (52) as well as with a rotating blowing rod (53). Proceeding from a preform input (54), the preforms (1) are transported by transfer wheels (55, 56) into the region of the heating wheel (52). Heat radiators (57) as well as blowers (58) are arranged along the heating wheel (52) to temper the preforms (1). Following sufficient tempering of the preforms, these are transferred to the blowing wheel (53) in the region of which the blow-molding stations (33) are arranged. The finished blow-molded containers (13) are fed by further transfer wheels to an output stretch (59).

To be able to model a preform (1) into a container (13) such that the container (13) has material properties which guarantee a long usability of the foodstuffs poured inside the container (13), especially of beverages, special steps must be adhered to in heating and orienting the preforms (1). Above and beyond this, advantageous effects can be obtained by maintaining special dimensioning regulations.

Various plastics can be used as thermoplastic materials. For example, PET, PEN or PP can be used.

The expansion of the preform (1) during the orientation process takes place through compressed air supply. The compressed air supply is subdivided into a pre-blowing phase in which gas, for example compressed air, is introduced at a low pressure level, and a subsequent main blowing phase in which gas is introduced at a higher level of pressure. During the pre-blowing phase, typically compressed air is used in intervals with a pressure of 10 bar to 25 bar and during the main blowing phase, compressed air is administered at intervals with a pressure of 25 bar to 40 bar.

Figure 4:
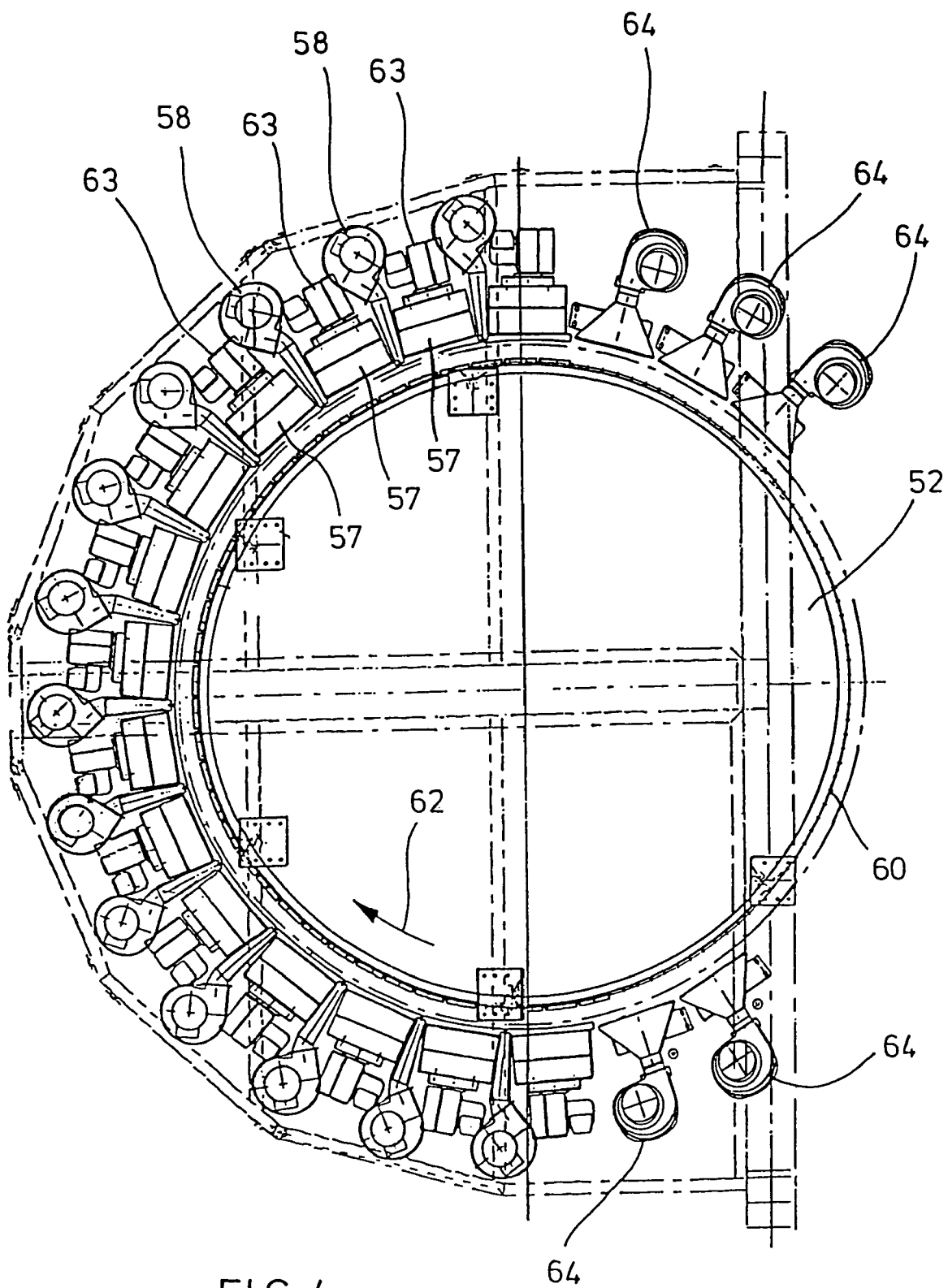
FIG. 4: Illustrates a heating apparatus with a rotating heating wheel as well a large number of heating elements as well as cooling air blowers.

FIG. 4 depicts an embodiment in which, similar to FIG. 3, a large number of heating elements (57) and blowers (58) are arranged along the periphery of the heating wheel (52). Reflectors (61) are arranged opposite to the heating elements (57) in relation to a transport path (60). The heating wheel (52) here rotates in a peripheral direction (62).

The blowers (58) are respectively arranged between two heating elements (57). In addition, the heating elements (57) themselves are outfitted with blowers (63) in order especially to guarantee a cooling of radiator tubes of the heating elements (57). A selective cooling of specified regions of the preforms (1) can take place through blowers (64) which are arranged peripherally (62) in front of or behind the heating elements (57). In particular, providing the blowers (64) with discharge elements (65), which possess discharge slots in the peripheral direction (62), is planned. Positioning the discharge slots for cooling a threaded region of preforms (1) is planned in particular.

Figure 5:
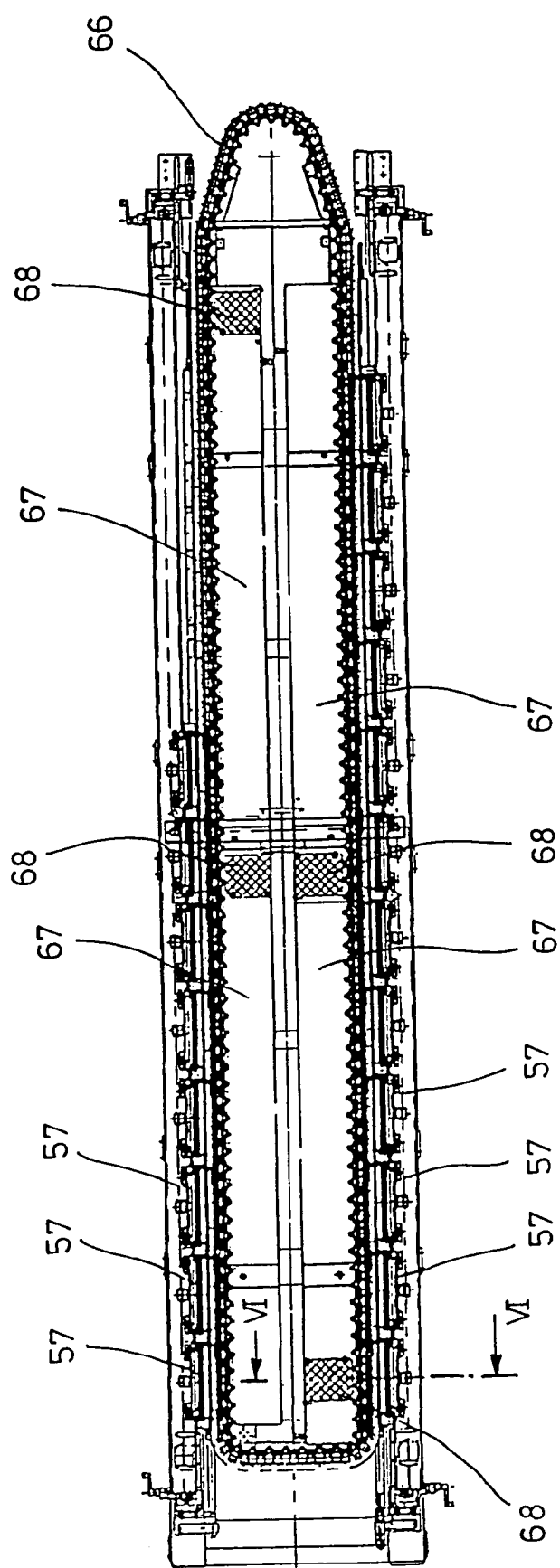
FIG. 5: Illustrates a plan view of a heating apparatus with a peripheral transport chain as well as a large number of heating elements and cooling air blowers.

In accordance with the embodiment in FIG. 5, a peripheral transport chain (66) is used instead of a rotating heating wheel (52). The use of a transport change (66) has the advantage of greater freedom in specifying the rotation path owing to which the required structural space can be minimized when using a larger number of heating elements (57). Channel-like distribution elements (67) are used in this embodiment for cooling the preforms (1) as well as if need be for cooling the heating elements (57), wherein said elements are arranged opposite the heating elements (57) and into which the cooling air by the blowers (68) is introduced.

Figure 6:
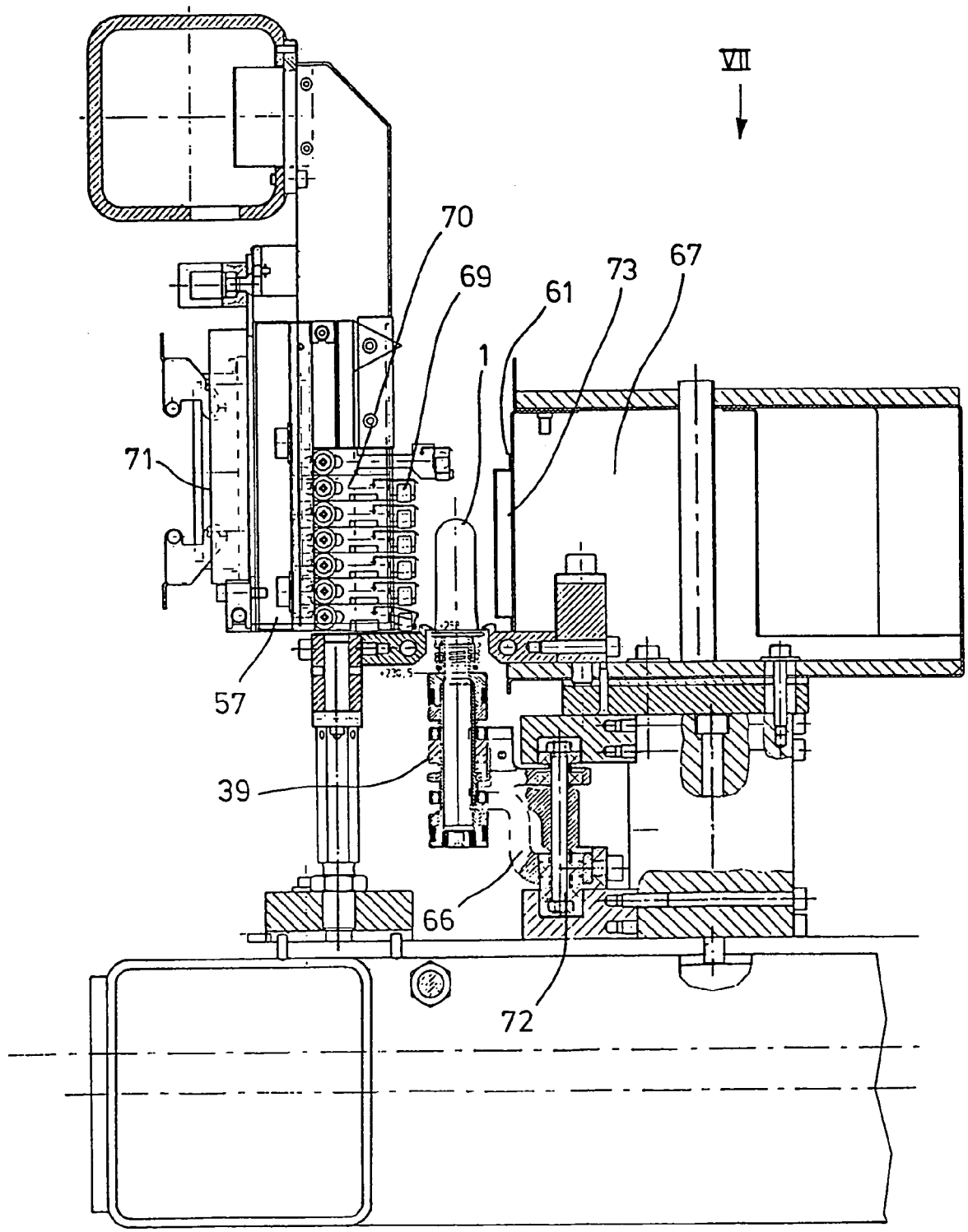
FIG. 6: Illustrates a cross section through a heating apparatus in which a preform is arranged between a heating element and a reflector.

FIG. 6 shows the construction of the apparatus in according to FIG. 5 in greater details in a vertical section. It can be seen in particular that the heating element (57) is outfitted with radiator tubes (69), which are fastened by sliding support elements (70). The heating element (57) can be connected with a (not represented) control unit and energy supply through electrical connection elements (71).

The transport chain (66) fastens and transport the support elements (39) for the preforms (1). The transport chain (66) consists of individual chain elements, which are coupled capable of rotation with one another through connection elements (72).

The distribution element (67) has a reflector (61) and discharge elements (73) in the region of its boundary facing the heating element (57).

Figure 7:
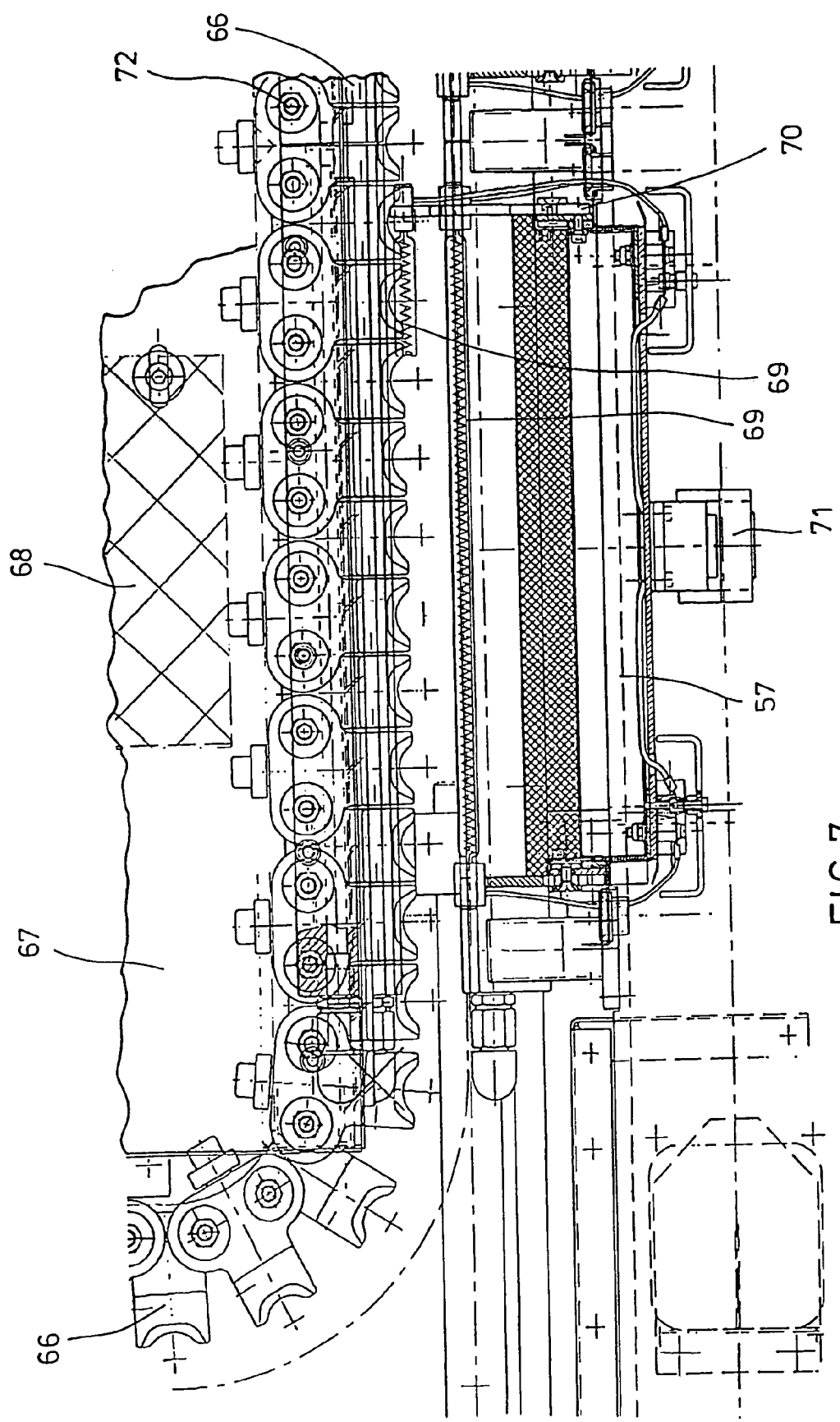
FIG. 7: Illustrates a plan view of a heating apparatus in which the preform is passed by heating elements by chain-like transport elements.

FIG. 7 shows a view of the apparatus in accordance with FIG. 5 and FIG. 6 corresponding to view direction VII in FIG. 6 from above. Here the articulated connection of the individual elements of the transport chain (66) through the connection elements (72) in particular is apparent. Likewise it can be seen that the heating elements (57) are realized in the form of modular-like heating spools. The representation in FIG. 7 moreover shows an enlarged representation in an area of section line VI-VI in the same direction of view as in FIG. 5.

To support even heating of the preforms (1) in the peripheral direction, placing the preforms (1) in rotation at least temporarily during their heating is provided. In manufacturing rotation symmetrical containers (13), rotation of the preforms (1) is conducted at least during the predominant time of the heating process. In the manufacture of containers (13) having a cross section configuration deviating from a circular contour, it can likewise prove to be advantageous to rotate the preforms only temporarily or to provide a gradual rotation in order to generate a defined temperature profile in the peripheral direction.

Figure 8:
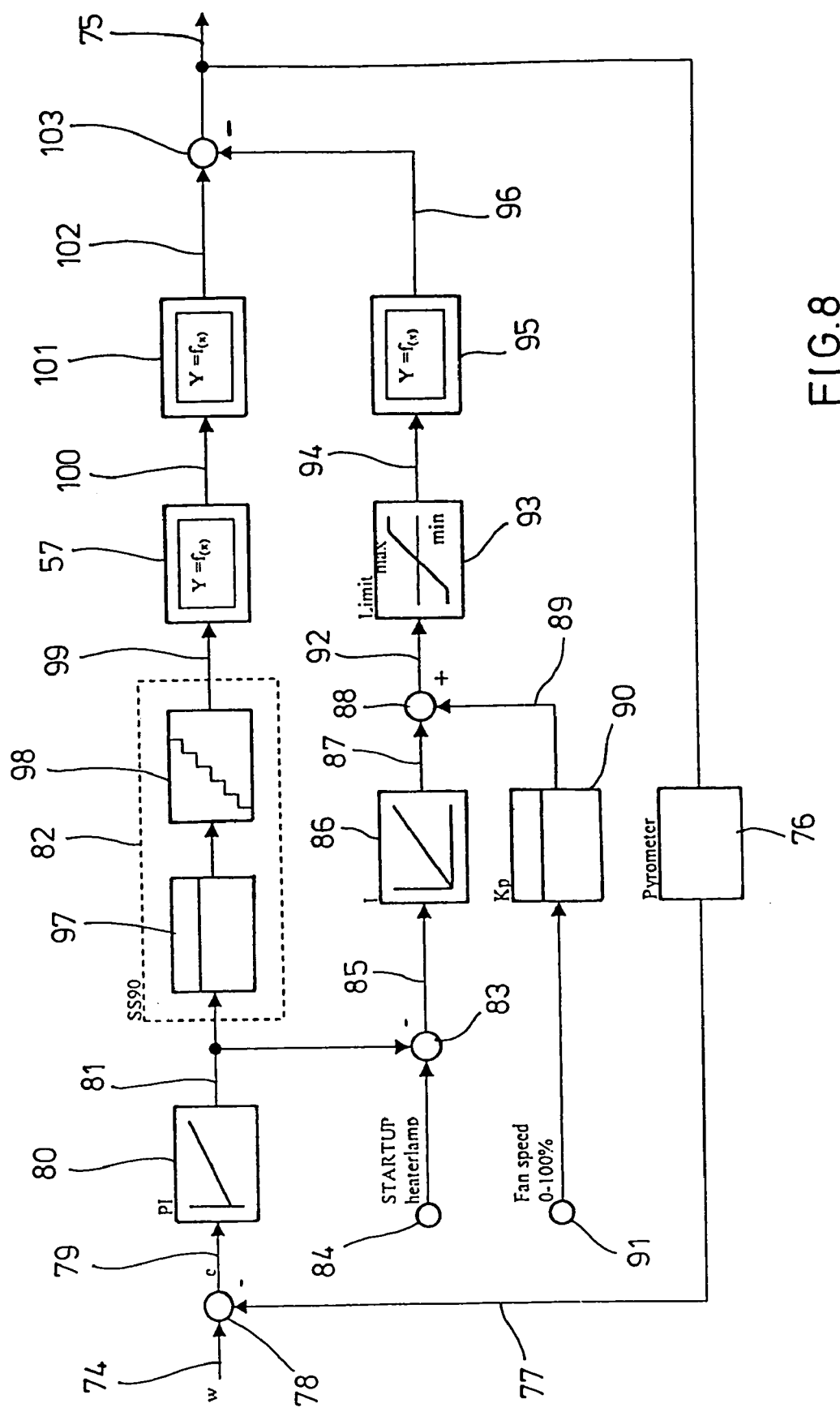
FIG. 8: Illustrates a schematic circuit diagram for regulating the heating elements and the cooling air blowers.

FIG. 8 depicts a circuit diagram for illustration of a regulation variant for the heating elements (57) as well as the blowers (58, 68). A target value (74) for an exterior temperature (75) of the preform (1) is fed to the controlled system, whereby the exterior temperature (75) represents the output magnitude of the controlled system. The exterior temperature (75) is recorded by a pyrometer (76) and an output value (77) of the pyrometer (76) is deducted from the target value (74) in the region of a difference-former (78). A control deviation (78) is fed to a regulating unit (80) as input magnitude. In the embodiment represented, the regulating unit (80) is realized as a PI regulating unit.

An output magnitude (81) of the regulating unit (80) is first fed to an actuator (82) and secondly to a difference former (83). The actuator (82) converts the output magnitude (81) of the regulating unit (80) into electrical energy supply for the heating elements (57). An initial value (84) for the heating elements is fed to the difference former (83) in addition to the output magnitude (81). A corresponding difference value (85) represents the input magnitude for a regulating unit (86), which in the example represented is constructed as an I regulator. An output value (87) of the regulating unit (86) is linked in the area of an addition element (88) with an output magnitude (89) of an amplifier (90), to which a target value (91) for the conveyance output of the blowers (58, 68) is fed in the input magnitude.

An output value (92) of the addition element (88) is fed to a delimiter (93) for specification of a maximal and a minimal rotational speed of the blower (58, 68). An output value (94) of the delimiter (93) acts on the controlled system (95), which compiles the characteristics of the blowers (58, 68) as well as the temperature behavior of the preforms (1) as a function of the blower action. An output value (96) of the controlled system (95) represents a component of the exterior temperature (75) of the preforms (1).

The actuator (82) includes the series connection of an amplifier (97) as well as a step by step integrator (98). An output magnitude (99) of the actuator (2) acts upon the heating elements (57), and a heat radiation (100) generated as output magnitude by the heating elements (57) is fed to a controlled system (101). The controlled system (101) compiles the characteristics of the heat track as well as the behavior of the preforms (1) as a function of heat radiation. An output value (102) of the controlled system (101) represents a further component for the exterior temperature (75) of the preforms (1).

The output magnitudes (96, 102) are compiled in the region of a difference former (103) whereby the heating of the preforms (1) caused by the heat radiators (57) is diminished by the cooling caused by the blowers (58, 68).

Figure 9:
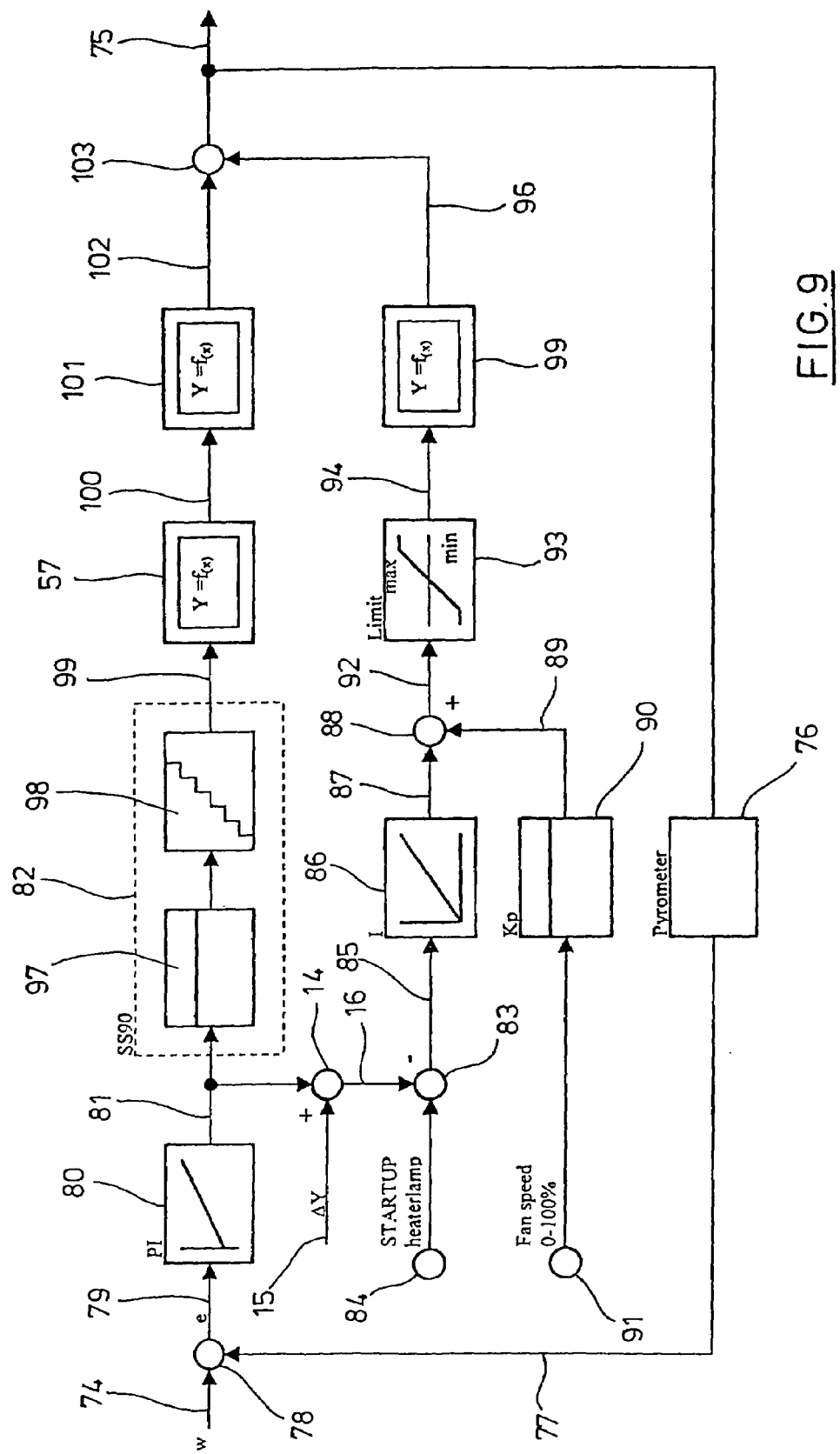
FIG. 9: Illustrates a circuit diagram of a regulating unit modified in relation to FIG. 8 and FIG. 10: Illustrates a regulating unit variant further modified in relation to the circuit diagram in FIG. 8.

The regulation variant represented in FIG. 9 additionally includes an addition element (14), which compiles the output value (81) of the regulating unit (80), as well as a difference signal (15). The output value of the addition element (14) is then conducted to the difference former (83) instead of directly feeding the output value (81) in accordance with the embodiment in FIG. 8.

Owing to the additional addition element (14), it is possible to attain the regulation goal in accordance with FIG. 8, namely maintaining the output magnitude (81) of the regulating unit (80) as well as the exterior temperature (75) of the preforms (1) as constant as possible. In accordance with the embodiment in FIG. 8, this goal is realized in that, to keep the surface temperature (75) constant, a change in the cooling output of the blowers (58, 68) is realized and in that, adapted to the respective production conditions, a respectively necessary cooling output is realized by the surface cooling of the preforms (1).

In accordance with FIG. 9, the current output signal (81) of the regulating unit (80) is monitored by a scan-hold-element. If the current output signal (81) deviates from an immediately preceding past value by a specifiable difference signal (15), then the specified value for the ventilation output is increased by a definable value. The increased cooling generated in this way causes the regulating unit (80) simultaneously to increase its output value again as well and the output value (81) to return at least into the region of its original value in this way.

Upon reaching the specified minimal or maximal ventilation output, which is defined through the delimiter (93), the regulatory sequence can be disengaged until the ventilation output reaches an operating point between the limiting values. A temperature regulation of the preforms (1) takes place exclusively through the heating elements (57) during such an operation.

Figure 10:
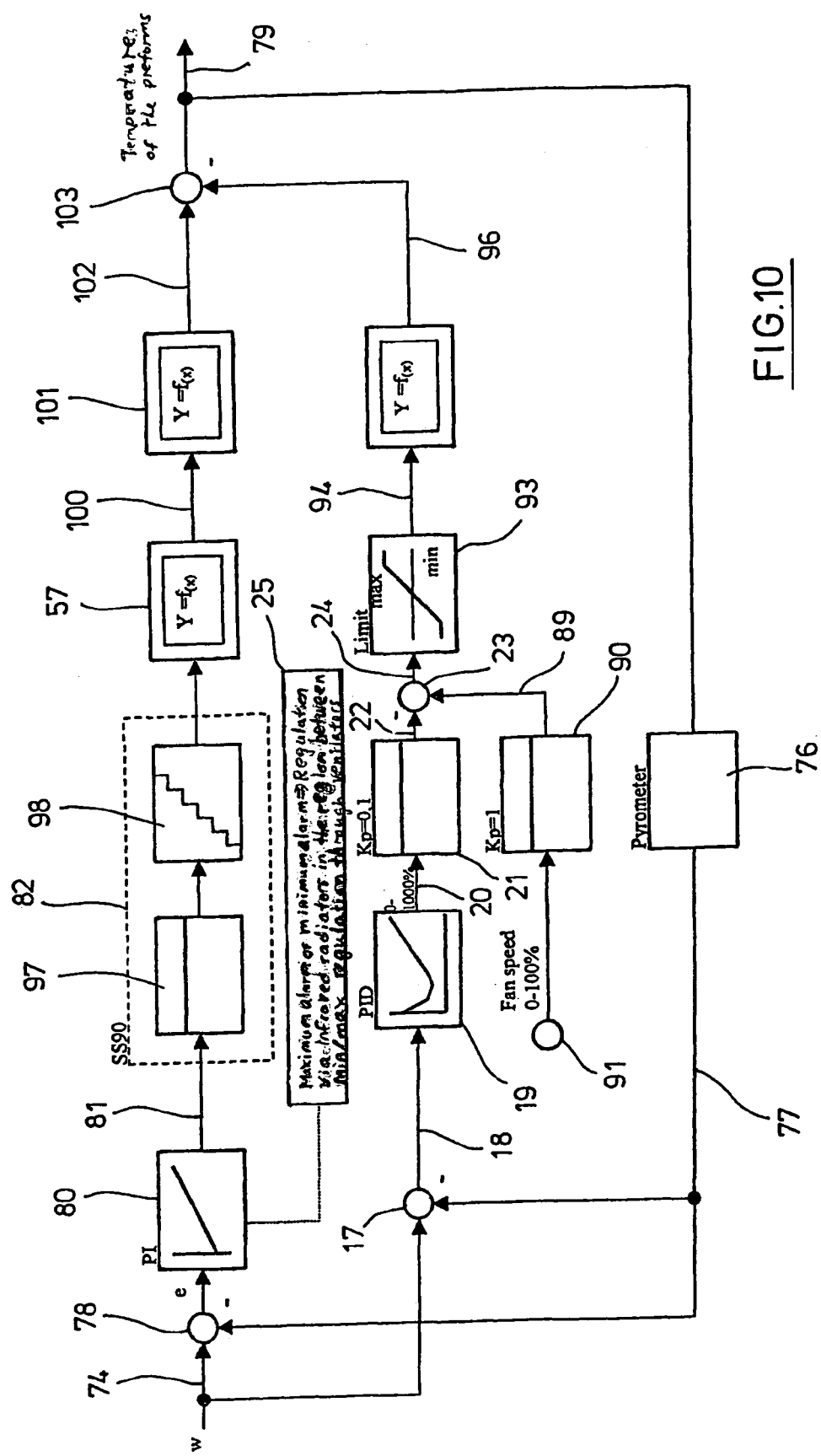

FIG. 10 depicts a further variant for regulation in accordance with FIG. 8. With this embodiment, a cascade regulating unit with two control circuits which operate independently of each other is realized for regulating the exterior temperature (75) of the preform (1). The target value (74) and the output value (77) of the pyrometer (76) are here fed to the difference former (78) as well as to a difference former (17) whose output value (18) is conducted to a regulating unit (19) which in the embodiment represented is realized as a PID regulating unit. An output magnitude (20) of the regulating unit (19) is fed to an amplifier (21). An output magnitude (22) of the amplifier (21) and the output magnitude (89) of the amplifier (90) are compiled in the region of a difference former (23). An output magnitude (24) of the difference former (23) serves in this regulatory variant as an input signal for the delimiter (93).

It is additionally possible to outfit the regulating unit (80) with a monitoring system (25) which issues a warning signal especially when the cooling output of the blowers (58, 68) has reached its minimal or its maximal value and if in this case the regulation of the exterior temperature (75) of the preforms (1) takes place exclusively through the heating elements (57). As an alternative to realizing the regulator (19) as a PID regulator, it is also possible to undertake a realization as a PI regulator or, for example, as a PID-Ti regulating unit.

It is especially possible with the regulatory variant in accordance with FIG. 10 to undertake a compensation through the regulating unit (80) in the event of negative regulatory deviations and to implement the equilibration with the aid of the regulating unit (19) in the event of positive regulatory deviations, at least as long as the maximal or minimal values of the delimiter (93) have not yet been reached.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. Method for tempering at least one preform of a thermoplastic material which in connection to tempering is molded into a container inside a blow mold by a medium under pressure, comprising:
   simultaneously heating the preform by heat radiation from heating elements and cooling the preform by cooling air
   measuring the preform surface temperature and comparing the measured surface temperature against a target surface temperature to determine a deviation in surface temperature; and
   compensating for the deviation in surface temperature by varying the intensity of the cool air applied to the preform to obtain a basically constant surface temperature of the preform.

2. Method according to claim 1 wherein an intensity of heat radiation is regulated for adaptation to at least one operating parameter.

3. Method according to claim 1, wherein the varying of the cooling air is conducted when the deviation in surface temperature exceeds a specified deviation value.

4. Method according to claim 1, wherein the preform surface temperature is measured by a pyrometer.

5. Method according to claim 1, wherein an internal temperature of the preform is measured.

6. Method according to claim 5, wherein the internal temperature of the preform is measured by a pyrometer.

7. Method according to claim 5, wherein the pyrometer is moved at least regionally into and out of an interior space of the preform for conducting the measurement.

8. Method according to claim 1, wherein the preform is transported past spatially stationary heating elements.

9. Method according to claim 7, wherein moving the pyrometer into and out of the interior space of the preform is mechanically derived from the transport motion of the preforms.

10. Method according to claim 1, wherein an internal temperature of the preform is regulated by the heating elements and the preform surface temperature is regulated by blowers.

11. Method according to claim 1, wherein a temperature inertia of the material of the preform is compensated through a mathematical model of a control system implemented in a regulation unit.

12. Method according to claim 1, wherein the regulating unit is provided with an integral action component.

13. Method according to claim 12, wherein a cascade regulation is implemented.

14. Method according to claim 1, wherein the preform is heated by infrared radiation.

15. Method according to claim 1, wherein the preform is provided with a temperature profile in a longitudinal direction.

16. Method according to claim 1, wherein the preform is provided with a temperature profile in their peripheral direction.

17. Method according to claim 1, wherein while the variation in the intensity of cool air occurs, a change in heat radiation is undertaken at the same time, to compensate for the deviation in surface temperature.

18. Method according to claim 1, wherein the intensity of the cool air is varied by a regulation of the rotational speed of a cooling blower.

19. Method according to claim 18, wherein the rotational speed is restricted to minimal and maximal values.

20. Device for tempering at least one preform of a thermoplastic material, comprising:
   at least one heating element, the at least one heating element is controlled by a control unit, wherein the control unit is realized as part of a closed circuit control; and
   at least one cooling air blower, wherein the device is arranged in a region of a transport path of the preform, which connects a preform input with a blowing station, wherein the cooling air blowers are connected to the control unit which evaluates a measuring signal of at least one temperature sensor, which records a temperature of the preform, and wherein the control unit has a characteristic for approximate constant maintenance of a surface temperature of the preform as a function of a specified target value for the purpose of specifying a target value for the output of the at least one cooling air blower, the at least one heating element and the at least one cooling air blower configured to operate simultaneously, the control unit using a difference former configured to determine a deviation between the surface temperature of the preform and the specified target value, the control unit configured to control the output of the at least one cooling air blower based on the deviation.

21. Device according to claim 20, wherein the closed control circuit has at least one regulating unit with an integral action component.

22. Device according to claim 21, wherein the closed control circuit has a pick-up for starting values for conducting a start-up process.

23. Device according to claim 21, wherein the at least one regulating unit is constructed as a cascade regulating unit.

24. Device according to claim 20, wherein the closed circuit control has one common regulating unit with an integral action component.

* * * * *